Patented Feb. 16, 1943

2,311,517

UNITED STATES PATENT OFFICE 2,311,517

PROCESS OF INCORPORATING VITAMINS A AND D INTO AQUEOUS MEDIUMS

Loran O. Buxton, Harrison, and Sol T. Lipsius, Newark, N. J., assignors to National Oil Products Company, Harrison, N. J., a corporation of New Jersey No Drawing. Application June 30, 1939, Serial No. 282,128

6 Claims. (Cl. 99—11)

This invention relates to vitamin compositions, more particularly to aqueous dispersions of fat-soluble vitamin concentrates and to a process of preparing these compositions.

Fat-soluble vitamin concentrates, e. g., vitamins A, D, E and K concentrates, are ordinarily sold in the form of solutions of the vitamins in the oils in which they naturally occur or in other oils. Such solutions of vitamins, however, may not be readily incorporated in aqueous bodies since they are generally immiscible therewith; this property is disadvantageous since it is highly desirable to incorporate fat-soluble vitamins in many aqueous food products and medicinal preparations such as milk, tonics and the like. Furthermore, if the natural oils in which the vitamins occur are employed as solvents for the concentrates, there is the additional disadvantage that these oils in most cases have disagreeable tastes and odors.

Ethyl alcohol solutions of the fat-soluble vitamins have been prepared for a variety of purposes; however, these solutions have never been employed for the purpose of incorporating the fat-soluble vitamins in aqueous bodies in spite of the great need in the art for a cheap and successful method of effecting this incorporation of these vitamins. It has been proposed to incorporate fat-soluble vitamins in aqueous bodies by dissolving a vitamin A or D concentrate in an ethyl alcohol solution of bile acids, adding an aqueous solution of sodium salts of bile acids to the alcohol solution and then diluting the product with water; however, this process has no commercial significance as the bile acids are relatively expensive and impart to the product a very disagreeable taste. It has also been proposed to dissolve vitamin D preparations in a propanediol or a butanediol and then add the solution thus obtained to water, milk or other aqueous bodies, whereby it is stated a dispersion of the vitamin D in the aqueous body results. However, this method of incorporating vitamin D in aqueous bodies has not been particularly successful due in part to the relative high cost of the solvents employed and in part to the relatively viscous nature of the vitamin solutions obtained in the practice of this process. Furthermore, it has been shown that certain people are allergic to propanediols and butanediols so that such individuals cannot ingest compositions containing these substances with any degree of comfort.

In accordance with still another process, aqueous dispersions of fat-soluble vitamins are prepared by employing dispersing agents such as gum acacia, gum tragacanth or India gum. However, these dispersions are somewhat difficult to prepare, prolonged agitation and beating of the constituents being required; moreover, because of the prolonged agitation and beating, considerable portions of the fat-soluble vitamins, particularly vitamin A, deteriorate and are thereby lost. Another disadvantage of this process is that dispersions having high vitamin potencies cannot readily be obtained thereby.

It is an object of our invention to provide stable dispersions of fat-soluble vitamin concentrates in aqueous bodies.

It is a further object of our invention to provide a simple and inexpensive process for producing such dispersions.

We have made the surprising discovery that solutions of fat-soluble vitamin concentrates in ethyl alcohol containing substantially no other low molecular weight alcohol and substantially no bile acid compounds may be mixed with aqueous bodies containing an amount of water equivalent to substantially more than 10% of the quantity of the ethyl alcohol, whereby stable dispersions of the concentrates in media containing the ethyl alcohol and substantially more than 10% water are formed These solutions may be added to water, to aqueous food products such as milk, coffee, tea, etc., and to aqueous medicinal preparations such as tonics, pharmaceuticals, etc., in order to produce products fortified with the fat-soluble vitamins; the addition of the alcoholic solutions to such aqueous bodies causes the vitamin concentrates to be dispersed in the aqueous media, and these dispersions remain stable indefinitely so that the fortified products thus prepared may be stored and shipped without separation of the concentrates and without substantial deterioration of their vitamin potencies. The alcoholic solutions of the fat-soluble vitamin concentrates may be dispersed in a medium containing the alcohol and substantially more than 10% but not substantially more than 30% water, and these dispersions may then be incorporated in aqueous bodies with great ease. Our invention is particularly applicable to the preparation of dispersions from high potency fat-soluble vitamin concentrates from which the portion insoluble in methanol at relatively low temperatures has been removed, since we have found that these concentrates yield alcoholic solutions which can be dispersed in aqueous bodies with great ease to give highly desirable fortified products. However, it is to be understood that our invention is not limited to the treatment of such high potency fat-soluble concentrates, but is applicable to all fat-soluble vitamin concentrates that are substantially soluble in ethyl alcohol. The term "low molecular weight alcohol" used throughout the specification and claims is intended to include aliphatic hydroxy compounds having eight or less carbon atoms.

The fat-soluble vitamin concentrate treated in accordance with our invention may be a vitamin A, D, E or K concentrate or a provitamin A concentrate which is substantially soluble in ethyl alcohol. Thus, for example, vitamin A concentrates containing from about 300,000 to about 2,500,000 A units per gram, preferably from about 750,000 to about 2,500,000 A units per gram, and vitamin D concentrates containing from about 100,000 to about 2,000,000 D units per gram, preferably from about 500,000 to about 2,000,000 D units per gram, may be employed in the practice of our invention. Mixed A and D concentrates containing from about 800,000 to about 1,800,000 A units per gram and from about 100,000 to about 1,400,000 D units per gram may also be treated. The concentrates may be prepared in any suitable manner; for example, vitamin A or D concentrates prepared from fish oils, carotene concentrates, and D concentrates obtained by irradiating ergosterol or 7-dehydro cholesterol may be employed. Preferably, the vitamin concentrates treated in accordance with our invention are prepared by saponification of fish liver oils and extraction of the unsaponified portion with a suitable solvent, since these concentrates are relatively inexpensive and form excellent dispersions in aqueous media when employed in the practice of our invention. As above mentioned, it is preferred to employ high potency fat-soluble vitamin concentrates from which the portion insoluble in methanol at relatively low temperatures has been removed; such high potency concentrates may be obtained by dissolving a fat-soluble vitamin concentrate in methanol at room temperature, then cooling the solution to about $-20°$ C. and separating the insoluble portion from the solution.

In carrying out the process of our invention, a suitable fat-soluble vitamin concentrate is dissolved in ethyl alcohol containing not substantially more than 5% water. The amount of concentrate dissolved in the ethyl alcohol will depend largely upon the potency of the particular concentrate being treated. Thus, for example, in the case of vitamin A concentrates containing about 2,500,000 A units per gram and vitamin D concentrates containing about 2,000,000 D units per gram, we have found that an amount of vitamin concentrate sufficient to form a solution containing approximately 2½% concentrate is appropriate. However, if vitamin concentrates having relatively low potencies, e. g., cod liver oil concentrates containing about 300,000 A units per gram, are to be treated in accordance with this invention, solutions containing as high as 12% of the fat-soluble vitamin concentrate may be prepared. Generally it may be said that the percentage of the fat-soluble vitamin concentrate in the ethyl alcohol solution prepared in accordance with our invention may vary from about 0.5% to about 12%, preferably from about 0.5% to about 8%, depending, as above described, upon the potency of the particular concentrate. In certain cases it may be found that the fat-soluble vitamin concentrate will not dissolve completely in ethyl alcohol; in such cases the residue remaining after solution may be removed in any desired manner and the solution treated as hereinafter described. The solution of the fat-soluble vitamin concentrate in the alcohol may be effected in any desired manner; preferably, the concentrate is agitated with the alcohol at approximately room temperature until solution is complete.

The alcoholic solutions thus prepared are stable and may be stored and shipped without substantial deterioration of the vitamin potency provided excessive access of air and sunlight is avoided. These solutions may contain from about 1,000 to about 150,000 A units per gram and about 200,000 or less D units per gram depending upon the amount of concentrate dissolved in the solution and the potency of the concentrate. Preferably, the potencies of the alcoholic solutions range from about 5,000 to about 75,000 A units per gram and from about 5,000 to about 50,000 D units per gram. It is to be understood that the alcoholic solutions may contain more than one of the fat-soluble vitamins; for example, there are many fat-soluble vitamin concentrates that contain a large amount of both vitamins A and D, which concentrates may be treated to great advantage in accordance with our invention.

It is also within the scope of our invention to incorporate in the alcoholic solutions other substances having a beneficial effect upon the aqueous bodies to which the vitamin solutions ultimately may be added; thus, for example, vitamins $B_1$, C and G may be incorporated in the alcohol solutions if desired. It may also be desirable to incorporate antioxidants such as hydroquinone in the alcoholic solution.

The alcoholic solutions prepared as above described may then be mixed with aqueous bodies to produce dispersions of the fat-soluble vitamin concentrates in aqueous media. Thus these solutions may be added to aqueous bodies such as water, to aqueous food products such as milk, coffee, tea, etc., and to aqueous medicinal preparations such as tonics, pharmaceuticals and the like, to form stable products fortified with the fat-soluble vitamins. We have found that in order to produce such fortified products, it is merely necessary to add the alcoholic solutions gradually to the aqueous bodies with mild agitation, whereby the vitamin concentrates are dispersed in the alcohol-water media; for example, an alcoholic solution prepared as above described may be added dropwise with mild agitation to water, milk, coffee, tonics, pharmaceuticals and the like, either just prior to consuming the products or at any other suitable time. In practically every case the addition of the alcoholic solutions causes the immediate formation of dispersions of the concentrates without any substantial separation of the oily concentrates. These dispersions formed with aqueous bodies are substantially permanently stable so that the fortified products may be stored and shipped if desired.

The amount of the alcoholic solution of the fat-soluble vitamin concentrate added to an aqueous body in accordance with our invention may vary widely depending upon the potency of the alcoholic solution, the quantity of the aqueous body to be fortified and the number of vitamin units it is desired to incorporate in the aqueous body. In some cases it may be desirable to first dilute the alcoholic solution with additional quantities of alcohol in order to permit more accurate regulation of the quantity of vitamin concentrate added. As a general rule a dosage of about 10,000 A units and 1,000 D units per day per individual is appropriate. It is a simple matter, once the potencies of the alcoholic solutions of the vitamin concentrates are determined, to regulate the amounts of the alcoholic solutions of the concentrates which should be added to the aqueous bodies in order to effect the production of fortified products having A and D potencies such that the users of these products will ingest approximately the proper amounts of vitamins.

Dispersions of the fat-soluble vitamin concentrates in media comprising ethyl alcohol and an amount of water substantially greater than 10%, but not substantially more than about 30%, may be prepared by introducing an appropriate amount of water into the alcoholic solutions of fat-soluble vitamin concentrates or by adding the alcoholic solutions to the water. Preferably, such dispersions are prepared by spraying into the alcoholic solutions an amount of water sufficient to form dispersions of the concentrates in media containing the alcohol and substantially more than about 10% but not substantially more than about 30% water. These dispersions thus obtained are concentrated aqueous dispersions of fat-soluble vitamin concentrates and contain from about 1,000 to about 75,000 A units per gram and from about 500 to about 75,000 D units per gram. These dispersions may be added to aqueous bodies in a similar manner to the way in which the alcoholic solutions are added or they may be incorporated in other food products such as butter, margarine, etc.; the concentrated dispersions may also be taken internally to furnish a potent supply of fat-soluble vitamins and may be employed in a variety of other ways.

In some cases it may be found that the mixing of the aqueous bodies with high potency alcoholic solutions of the vitamin concentrates may cause a slight separation of the concentrates; this separation is ordinarily evidenced by the formation of oil droplets or a ring of oil on the surface of the dispersions after the dispersions have been permitted to stand. However, it is a simple matter to separate the oily undispersed concentrate from the dispersions of the vitamin concentrates so that dispersions of vitamin concentrates in alcohol-water media containing substantially no undispersed oily material may always be obtained.

The following examples are illustrative of our invention. Amounts are given in parts by weight.

*Example I*

5 parts of a vitamin A concentrate containing 788,000 A units per gram were dissolved in 150 parts of 95% ethyl alcohol. The solution was then added dropwise to 1,500 parts of water with mild agitation. A dispersion of the vitamin concentrate in water containing 2,380 A units per gram was formed without any separation of the concentrate.

*Example II*

1 part of a vitamin D concentrate from which the portion insoluble in methanol at −20° C. had been removed and which contained 1,000,000 D units per gram and 688,000 A units per gram was dissolved in 20 parts of 95% ethyl alcohol. The solution was then added dropwise to 200 parts of water with mild agitation. A dispersion of the concentrate in water containing about 4,550 D units per gram and about 3,130 A units per gram was formed without any separation of the concentrate.

*Example III*

5 parts of a high vitamin A concentrate from which the portion insoluble in methanol at −20° C. had been removed and which contained 1,870,000 A units per gram were dissolved in 95 parts of absolute ethyl alcohol. 28 parts of water were then incorporated in this solution by spraying the water in the form of a very fine mist into the alcoholic solution with agitation. A dispersion of the vitamin A concentrate in the alcohol-water medium containing 75,000 A units per gram was formed without any separation of the concentrate. The dispersion remained stable for two weeks.

*Example IV*

A dispersion of a vitamin A concentrate in an alcohol-water medium was prepared exactly as described in Example III except that 20 parts of water were incorporated in the alcoholic solution. The dispersion thus obtained remained stable indefinitely.

*Example V*

5 parts of high vitamin D concentrate from which the portion insoluble in methanol at −20° C. had been removed and which contained 1,800,000 D units per gram and 2,050,000 A units per gram were dissolved in 195 parts of absolute ethyl alcohol. 40 parts of water were then incorporated in this solution by spraying the water in the form of a very fine mist into the alcoholic solution with agitation. A dispersion of the vitamin concentrate in the alcohol-water medium containing about 43,000 A units per gram and about 38,000 D units per gram was obtained without any separation of the concentrate. It was added to about 24,000 parts of milk with mild agitation whereby a fortified milk product containing about 370 D units per gram and about 420 A units per gram was obtained.

It will be evident from the above description that our invention provides a simple and inexpensive process for the incorporation of fat-soluble vitamin concentrates in aqueous bodies, whereby vitamin fortified products may be obtained which remain stable on standing and which may be employed for a wide variety of purposes. Since the products of our invention contain substantially no bile acid compounds, the disagreeable taste imparted to fortified products by the presence of these compounds is avoided. The ingredients necessary for the practice of our invention are all readily available and inexpensive so that commercially our invention represents a distinct advance over the prior art processes. Our invention, therefore, will be of great value in the preparation of aqueous vitamin fortified products.

Since certain changes in carrying out the above process and certain modifications in the compositions which embody the invention may be made without departing from its scope, it is intended that all matter contained in the above description shall be interpreted as illustrative and not in a limiting sense.

Having described our invention, what we claim as new and desire to secure by Letters Patent, is:

1. Process of incorporating vitamins A and D into an aqueous medium, which comprises saponifying an oil containing vitamins A and D; extracting said vitamins from the saponified oil by means of a solvent to form a concentrate thereof; removing from said concentrate the constituents therein which are insoluble in methanol at about −20° C.; and mixing an ethanol solution of the concentrate into an aqueous medium to form an aqueous dispersion of the concentrate in said aqueous medium.

2. Process of incorporating vitamins A and D into an aqueous medium, which comprises saponifying an oil containing vitamins A and D; extracting said vitamins from the saponified oil by means of a solvent to form a concentrate thereof; dissolving said concentrate in methanol; chilling the resultant solution to about −20° C. and removing the material precipitated at that temperature; removing the methanol from said concentrate; dissolving said concentrate in ethanol; and mixing an ethanol solution of the concentrate into said aqueous medium to form an aqueous dispersion of said concentrate in said aqueous medium.

3. Process of incorporating vitamins A and D into an aqueous medium, which comprises saponifying a fish oil containing vitamins A and D; extracting said vitamins from the saponified oil by means of a solvent to form a concentrate thereof; removing from said concentrate the constituents therein which are insoluble in methanol at about −20° C.; and mixing an ethanol solution of said concentrate into said aqueous medium to form an aqueous dispersion of said concentrate.

4. Process of incorporating vitamins A and D into an aqueous medium, which comprises saponifying a fish oil containing vitamins A and D; extracting said vitamins from the saponified oil by means of a solvent to form a concentrate thereof; removing from said concentrate the constituents therein which are insoluble in methanol at about −20° C.; mixing an ethanol solution of the concentrate into an intermediate aqueous medium to form an intermediate aqueous dispersion of the concentrate; and mixing the intermediate dispersion into a further quantity of an aqueous medium to form a final aqueous dispersion of said concentrate.

5. Process of incorporating vitamins A and D into milk, which comprises saponifying an oil containing vitamins A and D; extracting said vitamins from the saponified oil by means of a solvent to form a concentrate thereof; removing from said concentrate the constituents therein which are insoluble in methanol at about −20° C.; and mixing an ethanol solution of said concentrate into said milk to form an aqueous dispersion of said concentrate in said milk.

6. A process of incorporating a plurality of vitamins into an aqueous medium, which comprises saponifying an oil containing vitamins A and D; extracting said vitamins from the saponified mass by means of a solvent to form a concentrate thereof; removing from said concentrate the constituents therein which are insoluble in methanol at about −20° C. dissolving the vitamin A and D concentrate and at least one water-soluble vitamin in ethanol and mixing the ethanol solution into an aqueous medium to form an aqueous dispersion of said vitamins.

LORAN O. BUXTON.
SOL T. LIPSIUS.